(12) United States Patent
Lacey et al.

(10) Patent No.: US 11,150,039 B2
(45) Date of Patent: Oct. 19, 2021

(54) RADIATOR TUBE INSERT

(71) Applicant: DENSO International America, Inc., Southfield, MI (US)

(72) Inventors: Michael Lacey, Allen Park, MI (US); Michael Wojdyla, Warren, MI (US); Shane Harte, Westlake, OH (US)

(73) Assignee: DENSO International America, Inc., Southfield, MI (US)

( * ) Notice: Subject to any disclaimer, the term of this patent is extended or adjusted under 35 U.S.C. 154(b) by 184 days.

(21) Appl. No.: 16/027,110

(22) Filed: Jul. 3, 2018

(65) Prior Publication Data

US 2020/0011621 A1 Jan. 9, 2020

(51) Int. Cl.
*F28F 19/00* (2006.01)
*B60K 11/08* (2006.01)

(52) U.S. Cl.
CPC .......... *F28F 19/002* (2013.01); *B60K 11/08* (2013.01); *F28F 2225/04* (2013.01)

(58) Field of Classification Search
CPC .......... F28F 19/002; F28F 9/028; F28F 9/167; F28F 2225/04; F28F 2265/00; F28F 2265/30; F28F 2280/04; F28F 19/00; F28F 9/185; F28F 9/0282; F28D 1/05316; F28D 1/05366; B60K 11/08
See application file for complete search history.

(56) References Cited

U.S. PATENT DOCUMENTS

| 2,258,041 | A | 10/1941 | Young | |
| 7,413,005 | B2* | 8/2008 | Heine | F28D 1/05366 165/173 |
| 2005/0263263 | A1 | 12/2005 | Merklein et al. | |
| 2007/0131404 | A1 | 6/2007 | Overbury et al. | |

* cited by examiner

*Primary Examiner* — Harry E Arant
(74) *Attorney, Agent, or Firm* — Harness, Dickey & Pierce, P.L.C.

(57) ABSTRACT

A tube stiffener for insertion into a plurality of radiator tubes includes a plurality of inserts and first and second connection strips. Each insert is configured to extend into at least one of the plurality of radiator tubes to strengthen the plurality of radiator tubes. The plurality of inserts include a first end and a second end and a tab projecting from each of the first end and the second end. The first connection strip is fixed to the tab on the first end and the second connection strip is fixed to the tab on the second end. Each of the connection strips connects the plurality of inserts to each other.

12 Claims, 4 Drawing Sheets

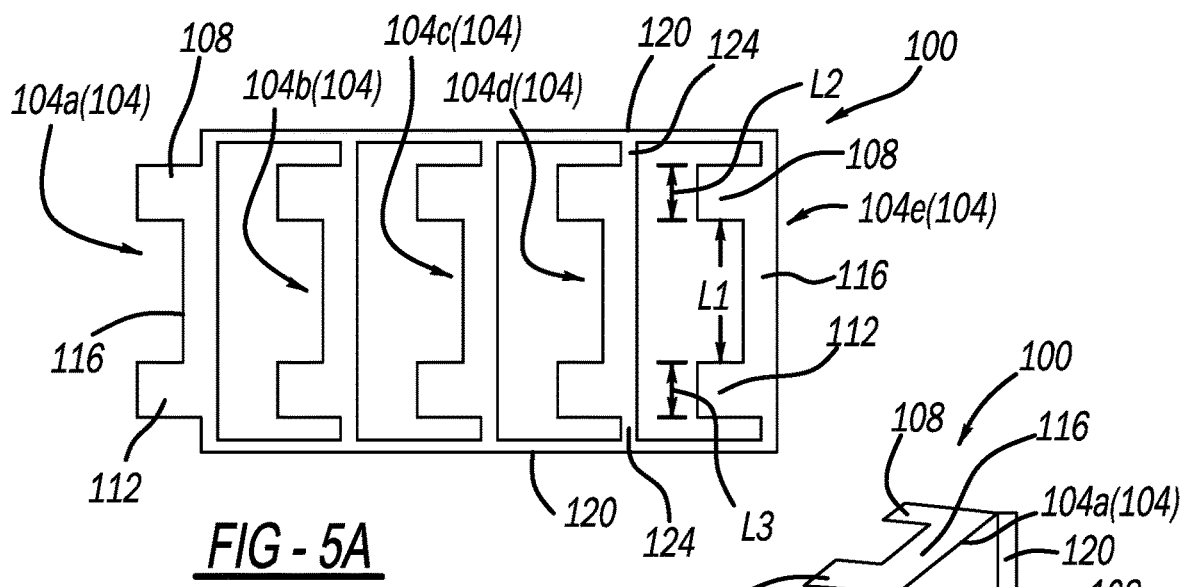
FIG - 5A
FIG - 5B
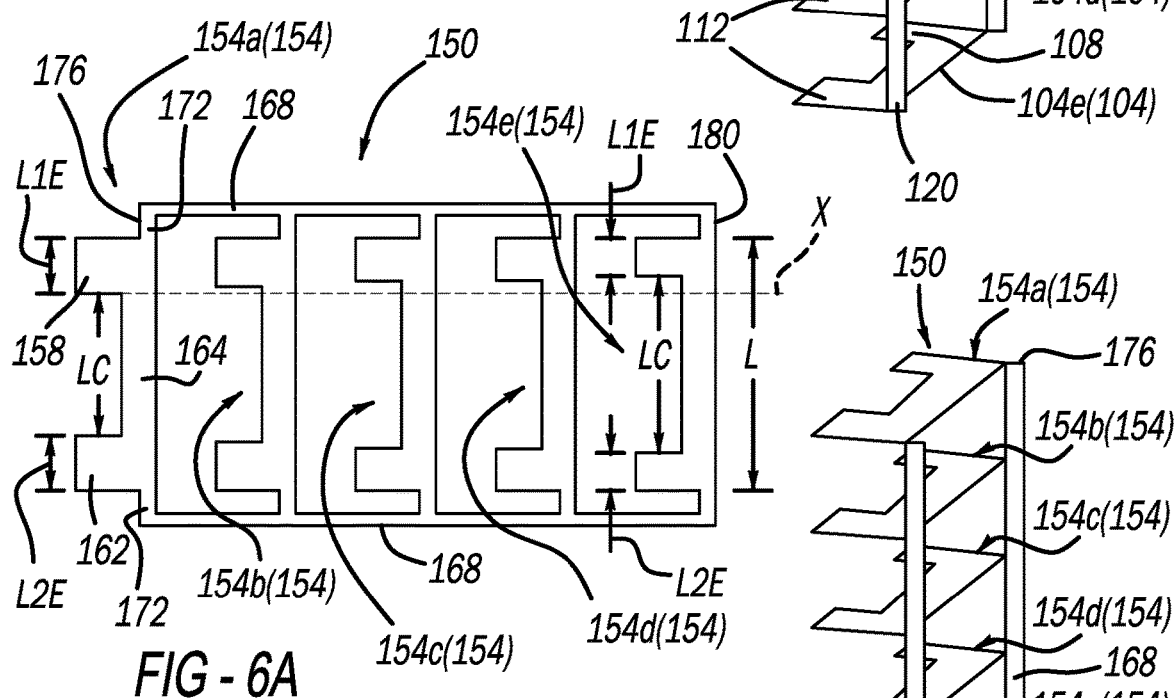
FIG - 6A
FIG - 6B

RADIATOR TUBE INSERT

FIELD

The present disclosure relates to radiator tube inserts, and specifically, to single stamping of radiator tube inserts.

BACKGROUND

This section provides background information related to the present disclosure which is not necessarily prior art.

Typical radiators include a core plate, an inlet tank, and an outlet tank. Radiator tubes extend the length of the core plate and transport coolant from the engine and across the core plate for cooling. During radiator use, thermal issues or vibration can cause deformation of radiator tubes or tube failure. Tube inserts are used in radiators to mitigate test failures due to the vibration and/or thermal shock. Typically, tube inserts may be single inserts of a common design.

Installation of the individual inserts, even when they are all the same, can require significant time and labor costs. Each of the inserts must be manually assembled in the radiator tubes before the inlet tank is crimped onto the core plate. The manual insertion is time consuming and leaves room for installer error.

Aside from labor time and costs, the inserts can also reduce coolant flow and overall performance of the radiator. Because the inserts occupy space in the radiator tubes that would otherwise be used to transport coolant, the inserts have the effect of decreasing coolant flow through the radiator tubes. The decreased coolant flow hinders the overall performance of the radiator.

SUMMARY

This section provides a general summary of the disclosure, and is not a comprehensive disclosure of its full scope or all of its features.

An example tube stiffener according to the present disclosure includes a plurality of inserts and first and second connection strips. Each insert is configured to extend into at least one of the plurality of radiator tubes to strengthen the plurality of radiator tubes. The plurality of inserts include a first end and a second end and a tab projecting from each of the first end and the second end. The first connection strip is fixed to the tab on the first end and the second connection strip is fixed to the tab on the second end. Each of the connection strips connects the plurality of inserts to each other.

The plurality of inserts and first and second connection strips may be manufactured in a single stamping.

The first end and the second end may be separated by a center section that is recessed such that the first end and the second end are configured to be inserted into the at least one of the plurality of radiator tubes without the center section.

The plurality of inserts may include at least two inserts and a length of the center section of each insert may increase from a top end of the tube stiffener to a bottom end of the tube stiffener.

A length of the first end and a length of the second end of each insert may decrease from the top end of the tube stiffener to the bottom end of the tube stiffener such that an overall length of each insert remains the same.

The plurality of inserts may include at least two inserts and a length of the center section of each insert may be the same from a top end of the tube stiffener to a bottom end of the tube stiffener.

Another example tube stiffener according to the present disclosure includes a plurality of inserts manufactured in a single stamping. Each of the plurality of inserts has a first end and a second end. The first ends of each of the plurality of inserts are connected together and the second ends of each of the plurality of inserts are connected together to fix the plurality of inserts in a predetermined order and location relative to one another.

The tube stiffener may further include first and second connection strips. The first connection strip may be fixed to each first end of the plurality of inserts and the second connection strip may be fixed to each second end of the plurality of inserts.

Each of the first and second ends of each of the plurality of inserts may include a projection connecting the first ends to the first connection strip and the second ends to the second connection strip.

The first end and the second end of each of the plurality of inserts may be separated by a center section and project beyond the center section in a direction perpendicular to a length of the insert.

The plurality of inserts may include at least two inserts and a length of the center section of each insert may increase from a top end of the tube stiffener to a bottom end of the tube stiffener.

A length of the first end and a length of the second end of each insert may decrease from the top end of the tube stiffener to the bottom end of the tube stiffener such that an overall length of each insert remains the same.

The plurality of inserts may include at least two inserts and a length of the center section of each insert may be the same from a top end of the tube stiffener to a bottom end of the tube stiffener.

The plurality of inserts may include at least three inserts and a length of the center section of each insert may vary from insert to insert along a length of the tube stiffener.

An example radiator according to the present disclosure includes a core, a plurality of tubes disposed within and extending along a length of the core, and a tube stiffener configured for insertion into the plurality of tubes to increase the strength of each of the plurality of tubes. The tube stiffener may further include a plurality of inserts. Each of the plurality of inserts has a first end and a second end. The first ends of each of the plurality of inserts are connected together and the second ends of each of the plurality of inserts are connected together to fix the plurality of inserts in a predetermined order and location relative to one another.

The plurality of inserts may be manufactured in a single stamping.

The tube stiffener may further include first and second connection strips. The first connection strip may be fixed to each first end of the plurality of inserts and the second connection strip may be fixed to each second end of the plurality of inserts.

Each of the first and second ends of each of the plurality of inserts may include a projection connecting the first ends to the first connection strip and the second ends to the second connection strip.

The first end and the second end of each of the plurality of inserts may be separated by a center section and project beyond the center section in a direction perpendicular to a length of the insert.

The plurality of inserts may include at least two inserts and a length of the center section of each insert may increase from a top end of the tube stiffener to a bottom end of the tube stiffener.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIGS. 5A and 5B are illustrations of an example tube stiffener according to the present disclosure.

FIGS. 6A and 6B are illustrations of another example tube stiffener according to the present disclosure.

Corresponding reference numerals indicate corresponding parts throughout the several views of the drawings.

DETAILED DESCRIPTION

Figure 1:
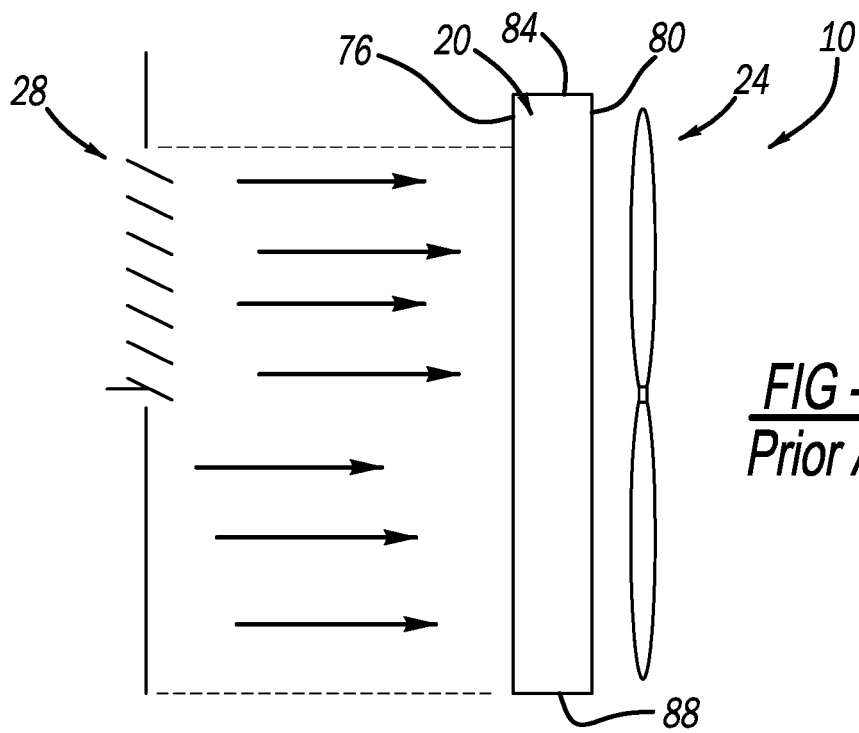
FIG. 1 is an illustration of a radiator in a vehicle.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 2:
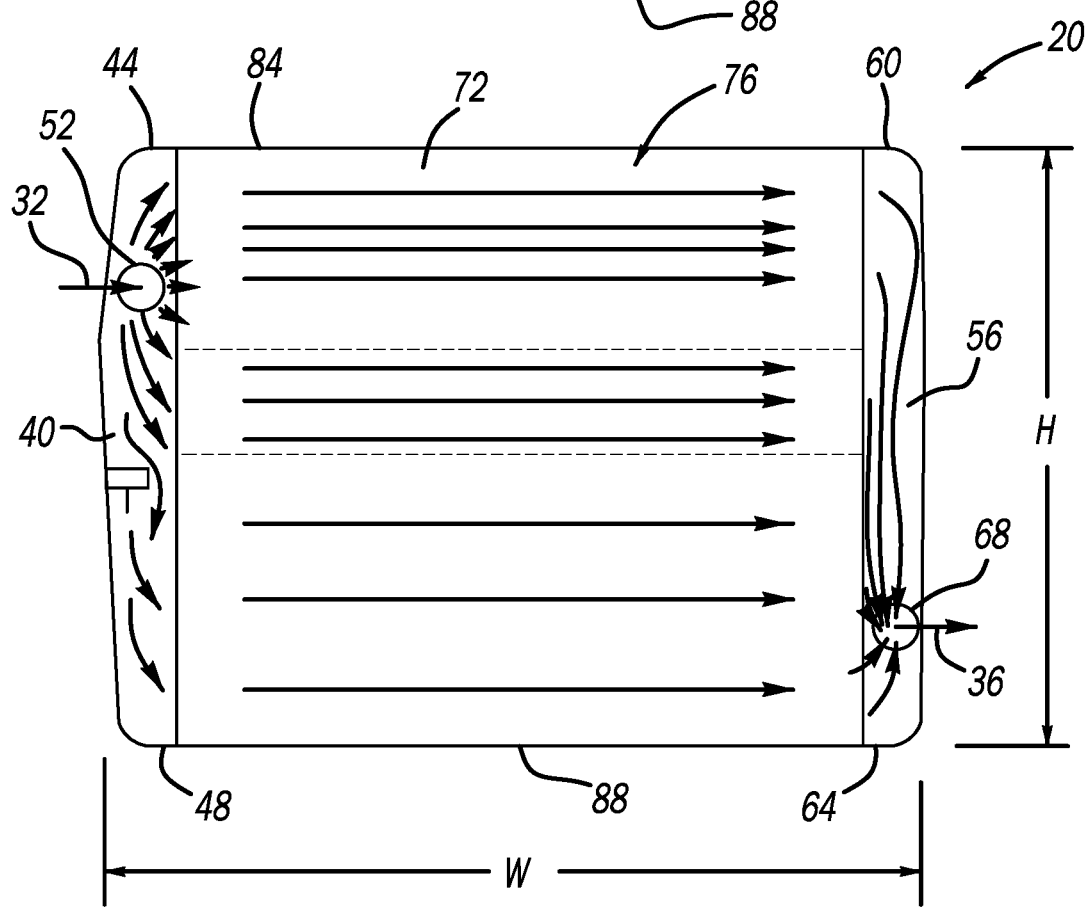
FIG. 2 is a front view of the radiator of FIG. 1.

With initial reference to FIGS. 1 and 2, a cooling system is generally illustrated at reference numeral 10. The cooling system 10 is suitable for cooling any suitable device, such as a vehicle engine. The engine may be installed in a vehicle, or the cooling system 10 is suitable for cooling any suitable non-vehicular engine as well. With respect to vehicles, the engine may power a passenger vehicle or any other suitable vehicle, such as any recreational vehicle, mass transit vehicle, military vehicle, construction vehicle/equipment, watercraft, aircraft, etc.

The cooling system 10 further includes a heat exchanger 20, which can be any suitable heat exchanger, such as a radiator 20. The radiator 20 may be arranged between a fan 24 and a grill 28 and may include obstacles therebetween. The radiator 20 is connected to the engine by coolant tubes 32 and 36. Coolant tube 32 provides a conduit for engine coolant flowing from the engine to the radiator 20. Coolant tube 36 provides a conduit for coolant flowing from the radiator 20 back to the engine.

The radiator 20 includes an inlet tank 40, which has an upper end 44 and a lower end 48. The inlet tank 40 includes an inlet 52, which, in the example illustrated, is closer to the upper end 44 than the lower end 48. Coolant is introduced into the inlet tank 40 through the inlet 52. Thus the inlet 52 can be connected to the coolant tube 32, which extends from the engine to the inlet 52.

The radiator 20 further includes an outlet tank 56, which has an upper end 60 and a lower end 64. The outlet tank 56 includes an outlet 68, through which coolant can exit the outlet tank 56. In the example illustrated, the outlet 68 is closer to the lower end 64 than the upper end 60.

Between the inlet tank 40 and the outlet tank 56 is a core, or core plate, 72 of the radiator 20. The core 72 includes a plurality of coolant conduits (such as coolant tubes, for example, shown in FIG. 3) extending between the inlet tank 40 and the outlet tank 56. The coolant conduits of the core 72 transport coolant from the inlet tank 40 to the outlet tank 56.

The radiator 20 is arranged such that an upstream side 76 faces the grill 28, and a downstream side 80 faces the fan 24. The radiator 20 has a width W extending from the inlet tank 40 to the outlet tank 56, and across the core 72. A height H of the radiator 20 extends between an upper end 84 and a lower end 88 of the core 72 (as well as between the upper end 44 and the lower end 48 of the inlet tank 40, and further between the upper end 60 and the lower end 64 of the outlet tank 56).

Figure 3:
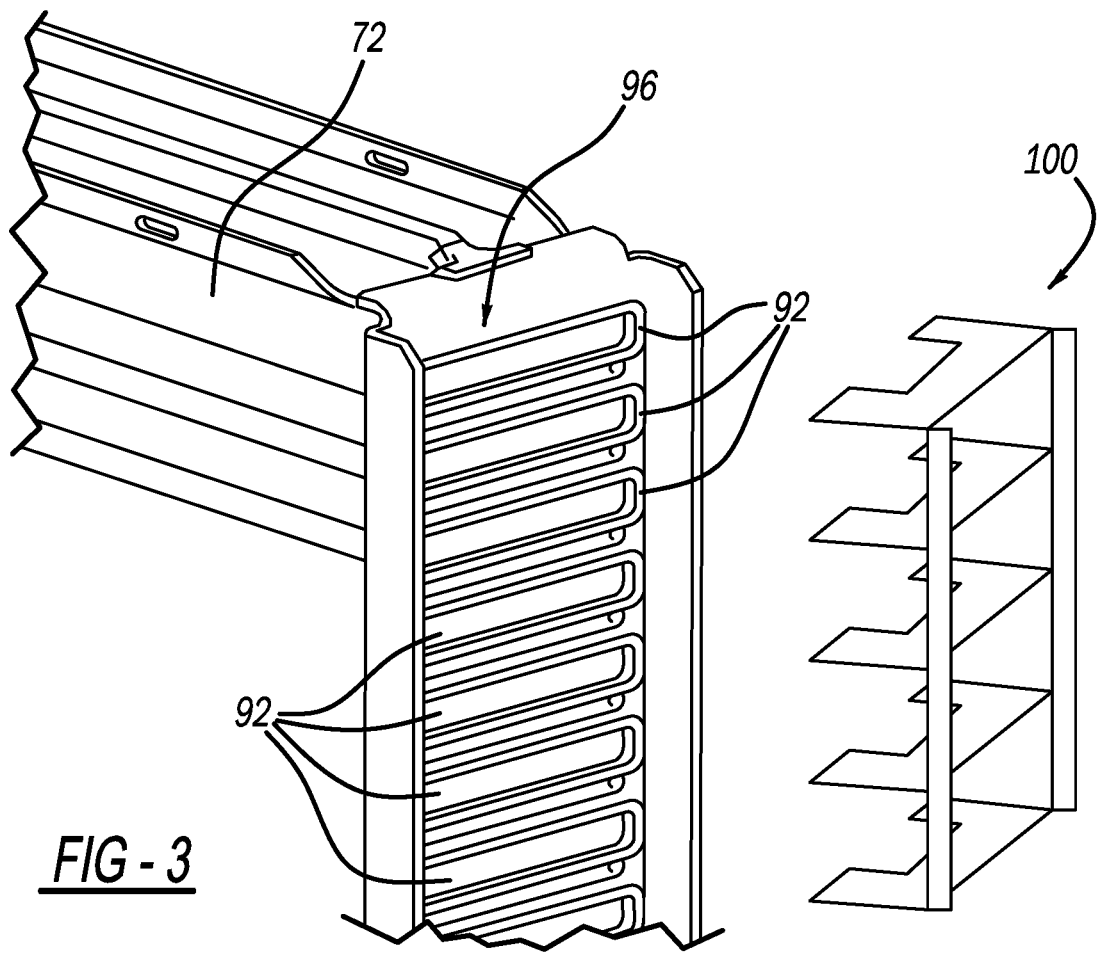
FIG. 3 is a detailed view of the radiator of FIG. 1 with a tube stiffener according to the present disclosure.

With additional reference to FIG. 3, a view of an example core 72 before the inlet tank 40 is crimped is shown. A plurality of coolant tubes 92 terminate at an end 96 of the core 72 that meets the inlet tank 40. The coolant tubes 92, as previously mentioned, extend the width of the core 72 between the inlet tank 40 and the outlet tank 56. During use of the radiator 20, the plurality of coolant tubes 92 transports coolant from the inlet tank 40 to the outlet tank 56 to cool, or reduce a temperature of, the coolant. For example only, the coolant tubes 92 may have an inner surface area of approximately 22.5 squared millimeters ($mm^2$) and the coolant may flow through the coolant tubes 92 at a nominal coolant velocity within the range of 1-2 meters/second (m/s). As coolant flows into the plurality of coolant tubes 92 at the inlet tank 40, the coolant is at an increased temperature and the coolant flow may be turbulent. Thus, ends of the coolant tubes 92 at the inlet tank 40 may be subject to increased stresses caused by thermal load or vibration.

The radiator 20 may further include a tube stiffener 100 according to the present disclosure to prevent distortion or failure of the plurality of coolant tubes 92 from the thermal or vibration stresses. During testing, coolant tubes subject to thermal issues or vibration are identified and the tube stiffener 100 is used to prevent deformation of tubes or tube failure. Adding a tube stiffener increases the stiffness and reduces stress concentrations at a joint between the tube and the core plate. For example only, a radiator tube 92 may have a thickness of 0.2 millimeters (mm) without use of any tube stiffener. However, the addition of a tube stiffener may increase the thickness to approximately 4.0 mm at the weakest points (i.e. at the joint between the tube and the core plate). By increasing the thickness, the radiator tube may be able to withstand higher stresses without deformation, distortion, or failure.

Figure 4:
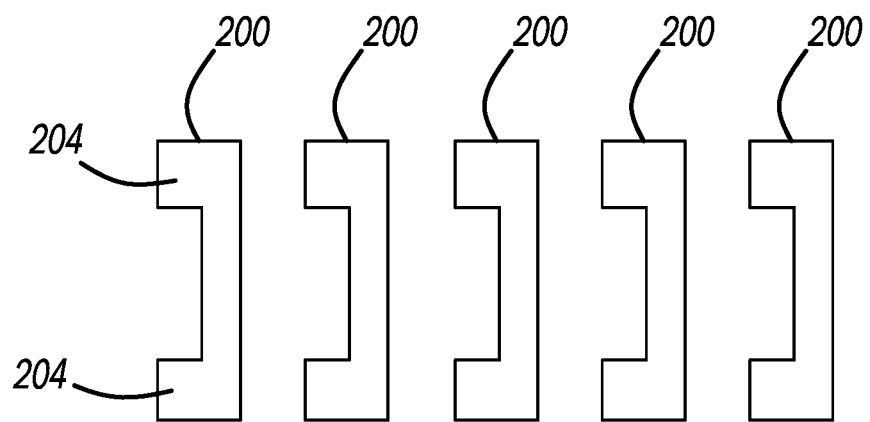
FIG. 4 is an illustration of currently used tube inserts.

In current practice (see FIG. 4), inserts 200 are individually stamped and manually inserted into the tubes 92 during assembly of the radiator 20 (before the inlet tank 40 is crimped). The manual inserts may have a squared-off, U-shape such that tabs 204 may be inserted into the ends of the tubes 92. The required individual manual insertion of the tube inserts 200 into the tubes 92 adds significant labor times and complexity to the assembly of the radiator 20. Additionally, the tube inserts 200 can have the effect of decreasing coolant flow through the tubes 92, thereby decreasing the performance of the radiator 20.

For example only, an inner surface area of each tube 92 may be approximately 22.5 $mm^2$ and a surface area of the stiffener may be approximately 13.5 $mm^2$. Therefore, a flow area is approximately 9.0 $mm^2$ which is approximately 40% of the nominal flow area. When the nominal flow velocity is approximately 1.0 m/s, the reduction in flow area reduces the flow velocity to 0.4 m/s for each tube 92 having the stiffener. Thus, the tube inserts 200 block flow through the tubes, but at a constant rate. When only a portion of the tubes are blocked, the manner that the tube flow is blocked increases the thermal shock at the first tube below the stiffeners.

With reference to FIGS. 5A and 5B, an example tube stiffener 100 of the present disclosure includes a plurality of inserts 104 for insertion into the tubes, or conduits, 92 which extend between the inlet tank 40 and the outlet tank 56. For example, the plurality of inserts 104 may include five inserts 104a-104e, or may include fewer or more inserts to accommodate the number of tubes 92 on the radiator 20. Each insert 104 includes a first elongated end 108, a second elongated end 112, and a center, recessed, section 116.

The plurality of inserts 104 may be identical to one another in size and shape, meaning that the first elongated end 108, the second elongated end 112, and the center section 116 are the same size and shape on each of the plurality of inserts 104. As illustrated in FIGS. 5A and 5B, the first and second elongated ends 108, 112 are rectangular-shaped projections having the center, recessed, section 116 therebetween. The first and second elongated ends 108, 112 project beyond the center section 116 such that the first and second elongated ends 108, 112 may be inserted into the tubes 92 in the radiator 20 to reinforce the tubes 92 at the joint between the tube 92 and the core plate 72. A length L1 of the center section 116 and lengths L2, L3 of the first and second elongated ends 108, 112, respectively, are designed to maximize the flow through the tubes 92 while still providing increased stiffness at the joint between the tube 92 and the core plate 72. For example only, the elongated ends 108, 112 may be sized such that they each occupy approximately 30% of the inner surface area of the tube 92, adding stiffness where necessary, but providing 40% of the inner surface area of the tube 92 as a flow area. While this example is provided, it is understood that elongated ends 108, 112 may be sized to accommodate any flow area.

The plurality of inserts 104 are attached by a connection strip 120 on each end 108, 112. A tab 124 which extends from the end 108, 112 to the connection strip 120 fixes each insert 104 to the connection strip 120. The tube stiffener 100 and plurality of inserts 104 may be formed of one or more materials, such as any single or combination of brazable materials, for example only, one or more aluminum alloys, or any other suitable material for reinforcing the strength of the tubes 92. For example, a first aluminum alloy may be used for the tube material and a second, different, aluminum alloy may be used as the clad or braze material. The tube stiffener 100 and plurality of inserts 104 may be formed from a single sheet, using a single stamping method where the single sheet of material is stamped once with the tube stiffener pattern, to create the tube stiffener 100 in the fewest amount of manufacturing steps possible.

An example of a single stamped sheet of the tube stiffener 100 is illustrated in FIG. 5A. As shown, the design may be created with a single stamping of a single sheet of material. The plurality of inserts 104 are attached by the connection strip 120 on each end 108, 112, and are stamped flat with the connection strips 120 during manufacturing and bent perpendicular to the connection strips 120 to create the tube stiffener 100 illustrated in FIG. 5B.

While the plurality of inserts 104 may be similar in size and shape to the inserts 200, the ability of the tube stiffener 100 to be manufactured from a single stamping allows inserts 104 to be created for every tube and fixed in position such that only a single insertion procedure is necessary for installation. Thus, the tube stiffener 100 may avoid the problems of difficulty in manufacture and assembly and high cost of labor.

With reference to FIGS. 6A and 6B, another example of a tube stiffener 150 according to the present disclosure is illustrated. As in FIG. 5A, the tube stiffener 150 in FIG. 6A may be created with a single stamping of a single sheet of material. The single material may be any brazable material, for example only, aluminum, steel, stainless steel, nickel alloy, iron, tungsten carbide, or any other suitable material for reinforcing the strength of the tubes 92.

The tube stiffener 150 includes a plurality of inserts 154. Each insert 154 includes a first elongated end 158, a second elongated end 162, and a center, recessed, section 164. A length LC of the center section 164 and lengths L1E, L2E of the first and second elongated ends 158, 162, respectively, are designed to maximize the flow through the tubes 92 while still providing increased stiffness at the joint between the tube 92 and the core plate 72.

Similar to the tube stiffener 100, the plurality of inserts 154 of tube stiffener 150 are attached by a connection strip 168 on each end 158, 162 using tabs 172. The plurality of inserts 154 are stamped flat with the connection strips 168 during manufacturing (FIG. 6A) and bent perpendicular to the connection strips 168 to create the tube stiffener 150 illustrated in FIG. 6B. While five inserts 154a-154e are illustrated, the tube stiffener 150 may include fewer or more inserts to accommodate the number of tubes 92 on the radiator 20.

In some circumstances thermal or stress concentration issues may only be present on one or a few of the tubes 92. However, placing a single insert (for example, one of prior art inserts 200) in the effected tube(s) only shifts the stresses to the surrounding tubes, increasing the thermal strain on the surrounding tubes. With the tube stiffener 150 of FIGS. 6A and 6B, the lengths LC, L1E, L2E may be varied from insert to insert allowing for customized tube stiffeners 150 with progressive flow rates which are designed to strengthen the problem areas and maximize flow.

As shown in FIGS. 6A and 6B, the tube stiffener 150 may have a top end 176 and a bottom end 180 for description purposes. The length LC may be progressively increased, insert-to-insert, from the top end 176 to the bottom end 180 and the lengths L1E, L2E may be progressively decreased, insert-to-insert, such that an overall length L of each insert may remain the same. Reference line X shown in FIG. 6A may further help illustrate this feature.

For example only, the lengths LC, L1E, L2E of the insert 154a may be sized such that they occupy (or block) approximately 60% of the inner surface area of the tube 92 at a tube 92 where the deformation or failure is projected to be highest, adding stiffness where necessary, but providing 40% of the inner surface area of the tube 92 as a flow area. The length LC may be increased and the lengths L1E, L2E may be decreased in the adjacent insert 154b, for the adjacent insert 154b to occupy (or block) approximately 50% of the inner surface area of the adjacent tube 92, increasing the flow area by 10%. The length LC may be increased and the lengths L1E, L2E may be decreased for the following insert 154c to occupy (or block) approximately 40% of the inner surface area of the next adjacent tube 92, again increasing the flow area by 10%. The lengths LC, L1E, L2E may further be adjusted for each following insert, for example 154d and 154e, to provide 10% additional flow until an insert 154 is not necessary. By progressively increasing the flow area in each adjacent tube (for example, by 10%), the thermal strain on adjacent tubes is improved, improving the life of the part. Additionally, as compared to previous examples, the flow rate for the progressively blocked tubes is increased, providing better radiator performance.

The connection strips 168 of the tube stiffener 150 in FIGS. 6A and 6B which fix the placement of the plurality of inserts 154 are even more important in this example embodiment. Varying the dimensions of the plurality of inserts 154 would create exponential increases in labor time and complexity if the plurality of inserts 154 were inserted individually and manually as previously done (i.e., for example with inserts 200). However, having the connection strips 168 fix the order and placement of the plurality of inserts 154 ensures that the plurality of inserts 154 are inserted in the tubes 92 in the correct order. As such, the embodiment of FIGS. 6A and 6B reduces the labor time and complexity of the tube stiffeners immensely.

While the tube stiffener 150 in FIGS. 6A and 6B illustrates the length LC being increased from the top end 176 to the bottom end 180, the length LC may be varied according to the needs of the individual tubes 92 and radiator 20. For example, the length LC may be shortest in a middle insert and increase towards the top end 176 and the bottom end 180, the length LC may be increase from the bottom end 180 to the top end 176, or the length LC may vary in any other manner to customize and maximize the effectiveness of the tube stiffener for the individual set of tubes 92 and radiator 20. The lengths L1E, L2E may be modified in relation to the length LC such that an overall length L of each insert 154 remains the same.

Figure 7:
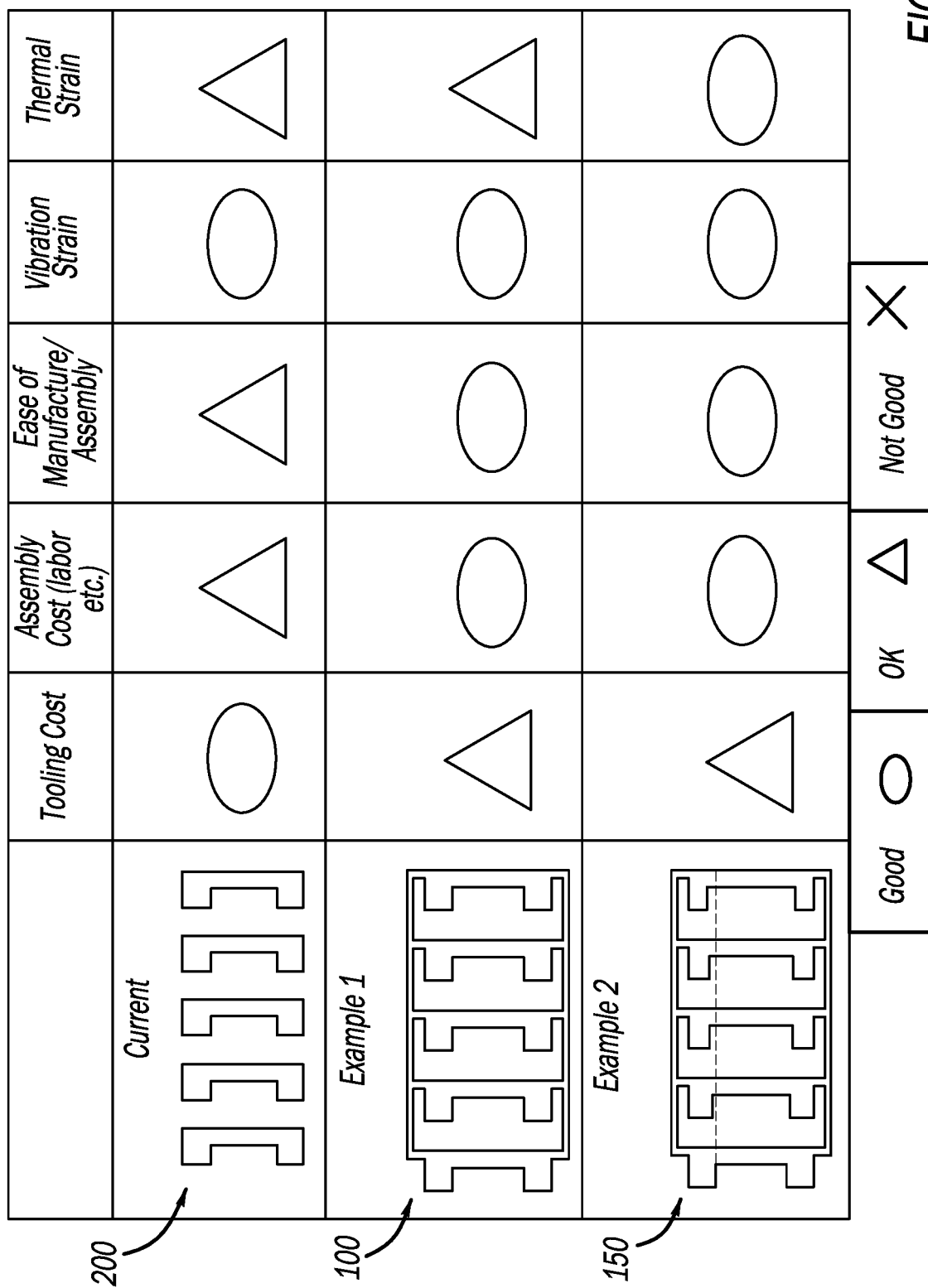
FIG. 7 is a chart comparing some aspects and advantages of the tube stiffeners of the present disclosure with the currently used tube inserts.

Referring to FIG. 7, a chart illustrating a comparison between prior art inserts 200, tube stiffener 100 according to the present disclosure, and tube stiffener 150 according to the present disclosure is provided. As shown in the a chart, the single stamping manufacturing of the tube stiffener 100 and the tube stiffener 150 provide improved vibration strain, ease of manufacturing and assembly, and cost of assembly. The tube stiffener 150 also adds improved thermal strain due to the progressive flow rate.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A tube stiffener for insertion into a plurality of radiator tubes, the tube stiffener comprising:
    a plurality of inserts, wherein each insert is a single monolithic piece and is configured to extend into at least one of the plurality of radiator tubes to strengthen the plurality of radiator tubes, each of the plurality of inserts including a first end and a second end, a first tab projects from the first end of each of the plurality of inserts and a second tab projects from the second end of each of the plurality of inserts, a center section connects the first tab with the second tab, and a face of the first tab and a face of the second tab extend along a same plane as a face of the center section for each of the plurality of inserts, the face of the first tab, the face of the second tab, and the face of the center section extend into the at least one of the plurality of the radiator tubes; and first and second connection strips, the first connection strip being fixed to the first tab on the first end of each of the plurality of inserts and the second connection strip being fixed to the second tab on the second end of each of the plurality of inserts, wherein each of the first and second connection strips connects the plurality of inserts to each other, and an outer edge of the first and second tabs on each of the plurality of inserts is disposed between an inner side of each of the first and second connection strips.

2. The tube stiffener of claim 1, wherein the plurality of inserts and first and second connection strips are manufactured in a single stamping.

3. The tube stiffener of claim 1, wherein the first end and the second end are separated by a center section that is recessed such that the first end and the second end are configured to be inserted into the at least one of the plurality of radiator tubes without the center section.

4. The tube stiffener of claim 3, wherein the plurality of inserts includes at least three inserts each having the first tab and the second tab, and a length of the center section of each of the plurality of inserts increases from a top end of the tube stiffener to a bottom end of the tube stiffener.

5. The tube stiffener of claim 4, wherein a length of the first end and a length of the second end of each insert decreases from the top end of the tube stiffener to the bottom end of the tube stiffener such that an overall length of each insert remains the same.

6. The tube stiffener of claim 3, wherein the plurality of inserts includes at least two inserts and a length of the center section of each insert is the same from a top end of the tube stiffener to a bottom end of the tube stiffener.

7. The tube stiffener of claim 1, wherein the first projection and the second projection extend with the center section in a direction perpendicular to a length of the insert, and the first projection and the second projection extend beyond the center section to define the center section.

8. A radiator comprising:
a core;
a plurality of tubes disposed within and extending along a length of the core; and
a tube stiffener configured for insertion into the plurality of tubes to increase a strength of each of the plurality of tubes, the tube stiffener including:
a plurality of inserts, the plurality of inserts including at least three inserts,
wherein each of the plurality of inserts has a first end and a second end, a first projection extends from the first end of each of the plurality of inserts and a second projection extends from the second end of each of the plurality of inserts, and a center section separates and connects the first projection with the second projection, the first projection and the second projection extending with the center section in a direction perpendicular to a length of the insert and the first projection and the second projection extending beyond the center section to define the center section, and a face of the first projection and a face of the second projection extend along a same plane as a face of the center section for each of the plurality of inserts the faces of the first tab, second tab, and center second extend into at least one of the plurality of the tubes, first and second connection strips, the first ends of each of the plurality of inserts are connected together by the first connection strip and the second ends of each of the plurality of inserts are connected together by the second connection strip to fix the plurality of inserts in a predetermined order and location relative to one another, and an outer edge of the first and second projections on each of the plurality of inserts is disposed between an inner side of each of the first and second connection strips.

9. The radiator of claim 8, wherein the plurality of inserts are manufactured in a single stamping.

10. The radiator of claim 8, wherein a length of the center section of each insert increases from a top end of the tube stiffener to a bottom end of the tube stiffener.

11. The radiator of claim 8, wherein a length of the center section of each insert is the same from a top end of the tube stiffener to a bottom end of the tube stiffener.

12. The radiator of claim 8, wherein each center section has a length that varies for each insert along a length of the tube stiffener.

* * * * *